Nov. 13, 1928.                                                    1,691,380
                        G. L. CURLE
            AUXILIARY MELTING POT FOR LINOTYPE MACHINES
                 Filed Sept. 17, 1927       3 Sheets-Sheet 1

Inventor
George L. Curle
By his Attorneys
Michael Kilgore

Nov. 13, 1928.                                        1,691,380
G. L. CURLE
AUXILIARY MELTING POT FOR LINOTYPE MACHINES
Filed Sept. 17, 1927         3 Sheets-Sheet 2

Inventor
George L. Curle
By his Attorneys
Merchant & Kilgore

Nov. 13, 1928.　　　　　　　　　　　　　　1,691,380
G. L. CURLE
AUXILIARY MELTING POT FOR LINOTYPE MACHINES
Filed Sept. 17, 1927　　　3 Sheets-Sheet 3

Inventor
George L. Curle
By his Attorneys

Patented Nov. 13, 1928.

1,691,380

UNITED STATES PATENT OFFICE.

GEORGE LOUIS CURLE, OF MINNEAPOLIS, MINNESOTA.

AUXILIARY MELTING POT FOR LINOTYPE MACHINES.

Application filed September 17, 1927. Serial No. 220,263.

This invention relates to linotype machines, that is, machines which automatically cast type in bar or other form, and the invention has been particularly designed for use in connection with the well known Mergenthaler linotype machines but is of course not limited to application to any specific type of such casting machines. The invention is in the nature of an improved auxiliary melting pot and for the purposes of this case it will be described as designed for application to a Mergenthaler linotype casting machine.

In my prior Patent No. 1,473,083 I have disclosed and claimed an auxiliary melting pot having a relatively fixed position in respect to the main melting pot and mounted for lateral movements therewith. The arrangement disclosed and claimed in my said prior patent is such that the flow of the molten metal from the auxiliary pot to the main pot was necessarily regulated by a float controlled valve. Moreover, very considerable reorganization of the main melting pot found in the standard Mergenthaler machine was required.

My present improved arrangement of the auxiliary melting pot and its co-operative arrangement in respect to the main pot is a radical departure from the structure of my prior patent and has the following highly important characteristics, to wit: The discharge of the molten metal from the auxiliary pot into the main pot is produced by a tilting, rocking or oscillatory movement of the former; the use of a valve or valve mechanism for controlling the flow from the auxiliary pot to the main pot is made unnecessary and in fact undesirable for the reason that the discharge from the auxiliary pot is produced very much as liquids would be poured from a teapot or pitcher; the auxiliary pot does not need and should not have any direct connection with the main pot and does not partake of that movement of the main pot which moves the discharge throat or passage of the latter to and from engagement with the mold; and the auxiliary pot may be applied to the machine for delivery into the main pot without modifying or changing the structure or arrangement of the main pot.

In the accompanying drawings which illustrate the invention as actually applied and used in connection with the Mergenthaler machine, like characters indicate like parts throughout the several views.

Referring to the drawings.

Figure 1:
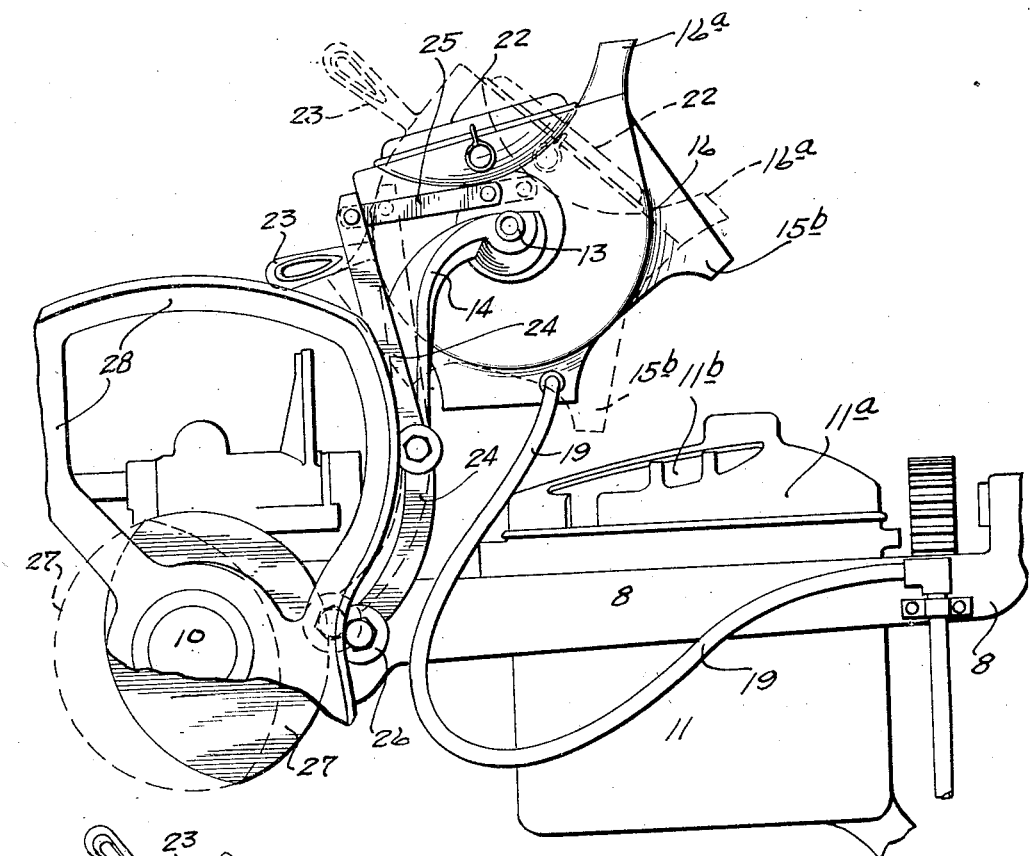
Fig. 1 is a side elevation with some parts broken away, showing a portion of the framework, a main melting pot, one of the main power-driven cam shafts, some other co-operating parts of a Mergenthaler machine and applied thereto, and illustrating my improved invention applied thereto.

Referring first to the preferred form of the invention illustrated in Figs. 1 to 5, inclusive, the numeral 8 indicates a portion of the fixed frame of the Mergenthaler machine, the numeral 9 indicates the main melting pot, and the numeral 10 indicates one of the main power-driven cam shafts of said machine. The main pot 9 has the customary metal discharge throat $9^a$ and it is placed within the usual housing 11, which latter has the customary removable cover $11^a$ formed with a large metal receiving passage $11^b$ for the delivery of the metal into the main pot. The main pot 9, as shown, is arranged to be heated by the customary gas burner head 12. To support the improved auxiliary melting pot there is provided a transverse shaft or spindle 13 which may be conveniently anchored at its inner end to a fixed portion $8^a$ of the main frame 8. To support the outer end of the shaft 13 there is provided an arm-like bracket 14 which, at its lower portion, is rigidly bolted or otherwise rigidly secured to the outer portion of the main frame 8.

The auxiliary melting pot 15 as preferably formed has a semi-cylindrical bottom and flat sides, but of course it may take other forms. Also, as shown, this auxiliary pot is placed within a housing 16 that is spaced therefrom to form a combustion chamber 17 at the open bottom of which, as shown, there is a gas burner 18 which receives gas through a flexible gas pipe or hose 19. Of course, electric heating means may be provided for either or both of the main or auxiliary melting pots. The housing 16 has a spout-like flame discharge passage 16ª at the top of its front side and is preferably provided with a relatively small auxiliary flame discharge passage 16ᵇ at the top of its back or rear side. At the top of the housing 16 is a curved baffle flange 17ª which causes the flames to take a tortuous course. The above noted structure of features of the housing while desirable are of very minor importance. The auxiliary pot 15, above the normal level of the molten metal when said auxiliary pot is in normal position, is provided with a discharge passage 15ª that leads to a discharge nozzle 15ᵇ which stands above the opening 11ᵇ of the main pot housing. The auxiliary pot is advisably formed with an upstanding interior perforated baffle plate 21 for a purpose which will hereinafter appear. The auxiliary pot 15 is shown as provided with a removable cover 22 and its housing 16 is shown as provided with a projecting handle 23, which latter, however, is not used when automatic operations are employed, but will be serviceable occasionally.

Figure 2:
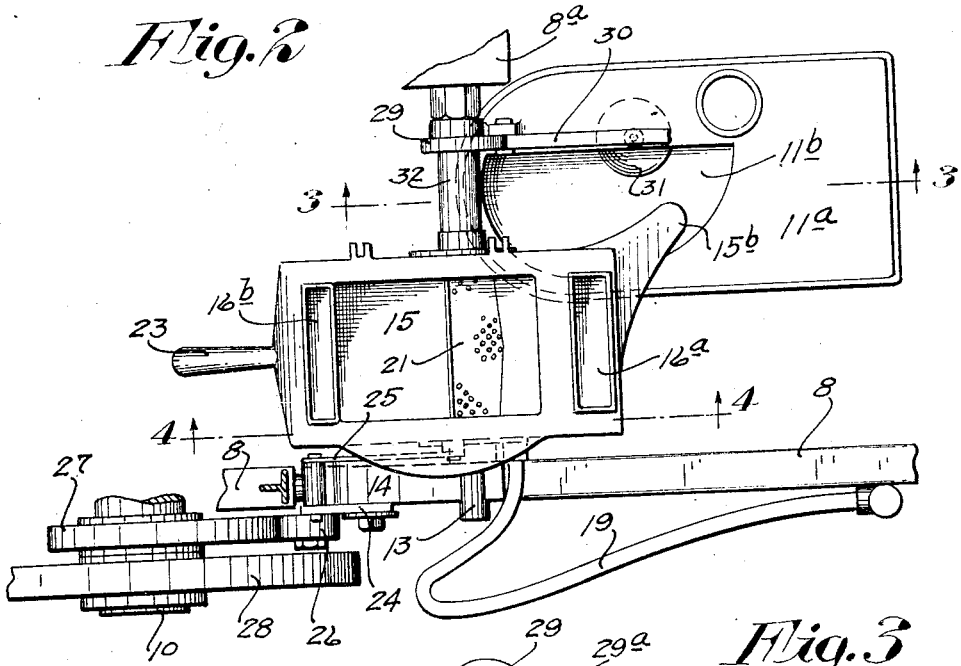
Fig. 2 is a plan view of substantially the same parts illustrated in Fig. 1.
Figure 4:
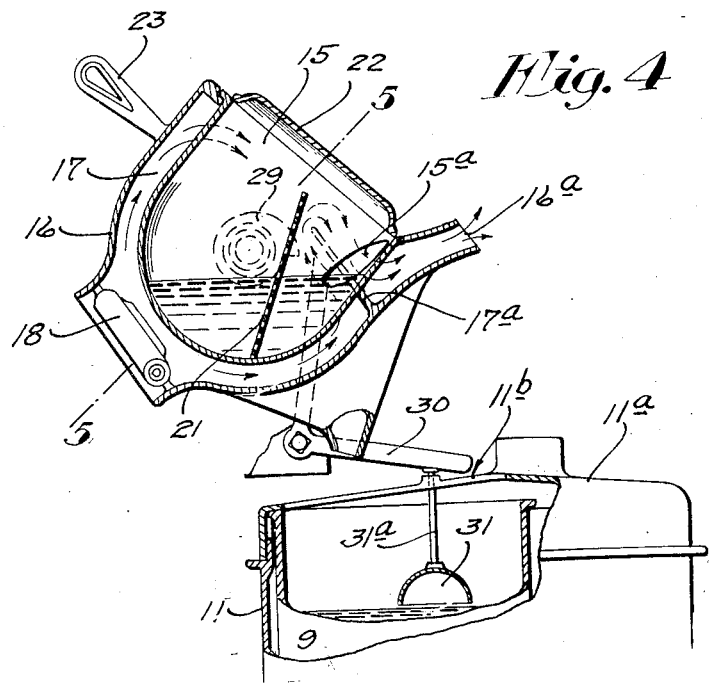
Fig. 4 is a section taken approximately on the line 4—4 of Fig. 2, but with some parts broken away and showing the auxiliary pot tilted to a discharging position.
Figure 5:
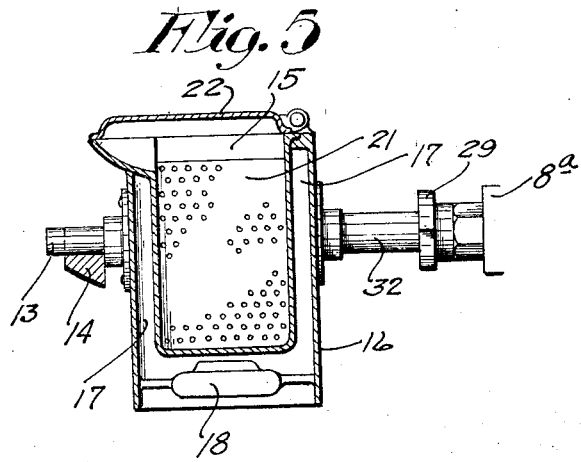
Fig. 5 is a transverse section taken approximately on the line 5—5 of Fig. 4.

The auxiliary pot 15 and its casing 16 are under strain to move from normally upright position shown in Fig. 1 into a discharging position shown in Fig. 4; and as shown, this is accomplished by giving to said pot and housing a preponderance of weight on that side of its pivot that is toward the right in respect to Figs. 1 and 2. A cam-actuated connection is provided for causing or permitting the tilting of the auxiliary pot into discharging position; and as shown this is accomplished by means of a lever 24 which, as shown, is intermediately pivoted to the bracket 14 and at its upper end is connected by a link 25 to a point on one side of the pot 6 above its pivot. At its lower end the lever 24 is provided with a laterally offset roller or wheel 26 that is subject to a cam 27 secured to and carried by the power-driven cam shaft 10. In Fig. 1 the numeral 28 indicates one of the large cams carried by the shaft 10 and found in the standard Mergenthaler machine, and the purpose of which need not here be considered.

With the arrangement described, once for each rotation of the cam 27 and shaft 10, the roller 26 will run off from the cam 27, and except for the provision of means presently to be described, the auxiliary pot will be tilted into its discharging position once for each rotation of said cam and shaft and regardless of whether or not an additional supply of metal in the main pot is required.

Figure 3:
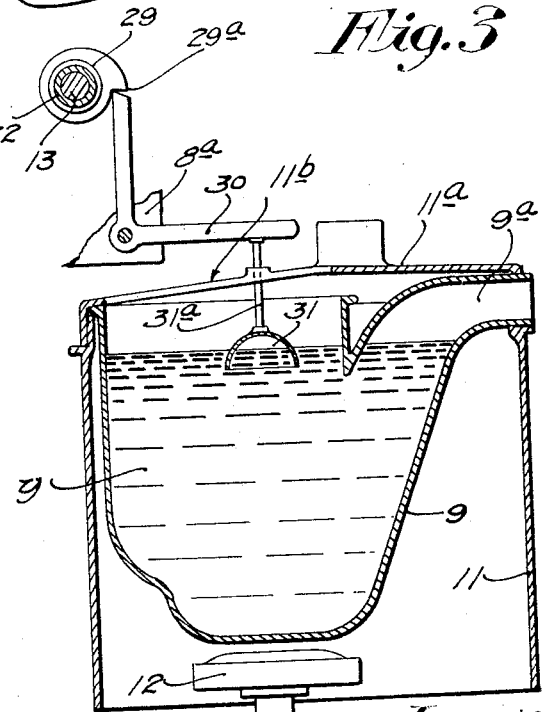
Fig. 3 is a vertical section taken on the line 3—3 of Fig. 2.

It is of course important that the amount of molten metal in the main pot be kept approximately at a constant level, and to accomplish this the auxiliary pot should be tilted to a discharging position for delivery therefrom into the main pot only at such time or when the molten metal in the main pot has been reduced at least slightly below the desired predetermined level. This may be accomplished in different ways, but as a simple and highly efficient means, I provide an intercepting device which, as shown, comprises a cam 29, a bell crank lever 30 and a float 31. The cam 29 is shown as secured on a sleeve 32 journaled on the shaft 13 and secured to one side of the auxiliary pot housing 16 so that said cam 29 oscillates with the auxiliary pot and its housing. The cam 29 is formed with a detent or stop shoulder 29ª as best shown in Fig. 3. The bell crank lever 30 is pivoted to the fixed portion 8ª of the main frame of the machine and its upper arm rides against the cam 29 and is adapted to engage the stop shoulder 29ª thereof to hold the auxiliary pot in its normal position and against tilting movement. The float 31 rides partly immersed in the molten metal y of the main pot 9 and has a stem 31ª that works vertically through a bearing in the cover 11ª with the upper end of said stem pressing against the horizontal arm of said bell crank 30. When the molten metal y in the main pot is maintained up to or approximately to the maximum level or altitude the float 31, acting on the bell crank lever 30, will cause the lever to engage the shoulder 29ª of cam 29 as shown in Fig. 3, and while this condition prevails, although the cam 29 acting on the lever 24 will release the auxiliary pot for this movement once for each rotation of the cam, nevertheless, said pot will not tilt but will be held in its normal position by the bell crank and co-operating elements of the intercepting device. As soon, however, as the molten metal in the main pot is reduced slightly in altitude the float 31 will be lowered and the weight of the horizontal arm of the bell crank 30 will be sufficient to move the upper arm of said bell crank out of engagement with the stop shoulder 29ª, thereby throwing the intercepting device out of action and releasing the auxiliary pot so that it will be tilted into a discharging position, once for each rotation of the shaft 10 and cam 27 until a sufficient amount of metal has been poured from the auxiliary pot into the main pot to bring the level of molten metal in the main pot up to the maximum desired altitude.

Figure 6:
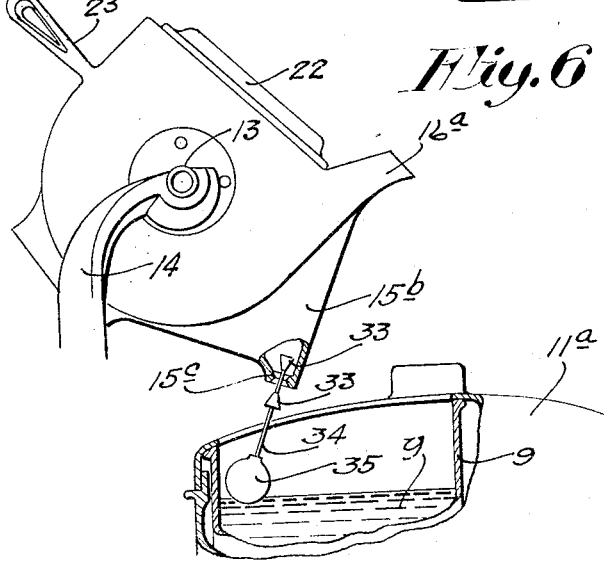
Fig. 6 is a fragmentary view partly in side elevation and partly in section illustrating a modified arrangement.

In the modified arrangement illustrated in Fig. 6, the nozzle 15ᵇ of the auxiliary pot is provided with a two-way facing valve seat 15ᶜ and for co-operation therewith a pair of reversely facing valves 33 secured on a stem 34 provided at its lower end with a float 35, which latter is adapted to be brought into contact with the molten metal in the main pot 9. This modification shows a possible use of the tilting auxiliary pot but the preferred arrangement before described is much preferable for the reason that it eliminates the use of valves to control the flow of molten metal, and which metal at certain times will be allowed to solidify. In the said arrangement shown in Fig. 6, however, when the auxiliary pot is in its normal position, the upper valve 33 will close port 15ᶜ and prevent the discharge of the molten metal from the auxiliary pot; and when the auxiliary pot is tilted as shown in Fig. 6 the float 35 will come into contact with the molten metal in the main pot and lift the upper valve so that there will be a discharge of molten metal from the auxiliary pot into the main pot. This lifting of the valve will be accomplished at each oscillatory or tilting movement of the auxiliary pot but when there is an excess of metal in the main pot the float 35 will lift the lower valve 33 and cause the same to close port 15ᶜ and thereby prevent a further discharge of metal from the auxiliary pot into the main pot.

Attention is now called to the fact that under oscillatory movements of the auxiliary pot the molten metal in said pot will be caused to flow back and forth from the perforations of the baffle plate 21, thereby breaking up and keeping the metal fairly commingled and reducing to a minimum the formation and accumulation of slag.

It will be understood that in the use of an auxiliary melting pot such as described, old type and linotype slugs will be introduced into the auxiliary pot and reduced to molten condition therein and of course only hot molten metal will be transferred or poured from the auxiliary pot into the main pot. This makes it possible to maintain an approximately constant temperature of the molten metal in the main pot (which is of the utmost importance in making good type castings) and of course makes it possible to maintain an approximately constant level of molten metal in said main pot. Of course, the amount of metal in the auxiliary pot and even the temperature thereof may vary considerably without causing a material change of the temperature in the main pot or a liquid level in the latter.

What I claim is:

1. The combination with a main pot, of an oscillatory auxiliary pot arranged to tilt for discharge into said main pot, and automatic means for oscillating said pot and for controlling the discharge therefrom into said main pot, according to the variations in the level of molten metal in said main pot.

2. The combination with a main pot, of an oscillatory auxiliary pot arranged to tilt for discharge into said main pot, automatic means for oscillating said pot and for controlling the discharge therefrom into said main pot, according to the variations in the level of molten metal in said main pot, and a housing movable with said auxiliary pot but spaced therefrom to afford a hot air chamber.

3. The combination with a main pot, of an oscillatory auxiliary pot arranged to tilt for discharge into said main pot, automatic means for oscillating said pot and for controlling the discharge therefrom into said main pot, according to the variations in the level of molten metal in said main pot, a housing movable with said auxiliary pot but spaced therefrom to afford a hot air chamber, and heat-producing means in said hot air chamber also movable with said auxiliary pot.

4. The combination with a main pot, of an oscillatory auxiliary pot arranged to tilt for discharge into said main pot, intercepting means controlled by the fluid in said main pot and holding said auxiliary pot against tilting movements when and only when the fluid in said main pot is to a predetermined level, and timed means operating to intermittently release said auxiliary pot for tilting movement.

5. The combination with a main pot, of an oscillatory auxiliary pot arranged to tilt for discharge into said main pot, timed automatic means operating intermittently with an action tending to cause tilting movements of said auxiliary pot, and means controlled by the altitude of fluid in said main pot and operating to permit flow of liquid from said auxiliary pot into said main pot when and only when the liquid in said main pot is below a predetermined level.

6. The combination with a main pot, of an oscillatory auxiliary pot arranged to tilt for discharge into said main pot, timed automatic means operating intermittently with an action tending to cause tilting movements of said auxiliary pot, and means controlled by the altitude of fluid in said main pot and operating to permit flow of liquid from said auxiliary pot into said main pot when and only when the liquid in said main pot is below a predetermined level, said latter noted means including a float that rides partly immersed in the fluid in said main pot.

7. The combination with a main pot, of an oscillatory auxiliary pot arranged to tilt for discharge into said main pot, a detent connected to oscillate with said auxiliary pot, a lever normally engaging said detent and holding said auxiliary pot against tilting movement, and a float subject to liquid in said main pot, operated by said lever and serving to release the same from said detent and permitting tilting movement of said auxiliary pot when and only when the liquid in said main pot falls below a predetermined level.

8. The structure defined in claim 7 in further combination with a lever having a connection to said auxiliary pot for tilting the same, and a power-driven cam operating with two actions, one serving to release said auxiliary pot for tilting movement and the other to restore the same to normal position.

9. The combination with a main pot, of an oscillatory auxiliary pot arranged to tilt for discharge into said main pot, intercepting means normally holding said auxiliary pot against tilting movement and acted on by the liquid in said main pot to release said auxiliary pot for tilting movement when and only when the liquid in said main pot falls below a predetermined level, and timed means operating on said auxiliary pot with two actions, one tending to release the same for tilting movement and the other to return said auxiliary pot to normal position.

10. The structure defined in claim 1 in which said auxiliary pot is provided with a baffle plate for the purposes specified.

In testimony whereof I affix my signature.

GEORGE LOUIS CURLE.